United States Patent [19]

Woodruff

[11] Patent Number: 4,481,557
[45] Date of Patent: Nov. 6, 1984

[54] ELECTROSTATIC COATING SYSTEM
[75] Inventor: Frederick W. Woodruff, Indianapolis, Ind.
[73] Assignee: Ransburg Corporation, Indianapolis, Ind.
[21] Appl. No.: 423,822
[22] Filed: Sep. 27, 1982
[51] Int. Cl.³ .............................................. B05B 5/02
[52] U.S. Cl. .................................. 361/235; 361/226; 363/49
[58] Field of Search ............... 361/235, 226, 227, 228, 361/229; 363/21, 49

[56] References Cited
U.S. PATENT DOCUMENTS 3,912,989 10/1975 Watanabe et al. .............. 361/235 X
4,402,030 8/1983 Moser et al. ..................... 361/235 X Primary Examiner—Harry E. Moose, Jr.
Attorney, Agent, or Firm—Barnes & Thornburg

[57] ABSTRACT

A system for controlling a high-voltage supply which is inhibited for a time after energization to prevent spurious deenergization. The high-voltage supply includes a source for generating a signal representative of the desired output high voltage. A feedback voltage control responds to this signal and controls the high-voltage supply. The system includes a source for developing a linear ramp signal which varies from an initial value at which the output of the high-voltage generator is under the control of the ramp signal source to a value at which the output of the high-voltage generator is under the control of the signal representative of the desired output high voltage.

1 Claim, 4 Drawing Figures

FIG. 4

ELECTROSTATIC COATING SYSTEM

This invention relates to power supplies for use in electrostatic finishing systems, and particularly to supplies of the general type described in U.S. Pat. No. 4,075,677 and U.S. Pat. No. 4,187,527. This application incorporates by reference the teachings of those patents.

In systems of the type described in the two aforementioned U.S. patents, as in many electrical systems, it is normal to experience a brief "surge" of current after energization of the system. This is true of high-voltage power supplies used in electrostatic finishing systems. In the systems of the previously mentioned U.S. patents, "slope" circuits measure the rate of current rise and uncouple the high-voltage output terminals of the units from the high-voltage generator or source whenever the slope circuits detect rates of change of current at the high-voltage output terminals high enough to indicate the possibility of an impending spark. Start-up current surges and impending sparks frequently have current rates of rise of similar magnitude. As a result, the slope circuits of the previously mentioned patented systems are inhibited during start-up until steady-state conditions are reached.

According to the invention, a high-voltage supply includes means for providing a signal representative of the desired output high voltage, means for responding to the signal to generate the desired output high voltage, and means for coupling the signal-providing means to the high-voltage generating means. The high-voltage supply also includes means for inhibiting the high-voltage supply for a time after energization to prevent spurious de-energization of the high-voltage supply. The supply further includes a source for developing a second signal which varies in a controlled manner from an initial value at which the output of the high-voltage generator is under the control of the second signal source to a value at which the output of the high-voltage generator is under the control of the signal-providing means.

According to the invention, the source for developing the second signal comprises a ramp generator.

The invention may best be understood by referring to the following description and accompanying drawings which illustrate the invention. In the drawings:

FIG. 4 is a partly block and partly schematic circuit diagram of a system constructed according to the present invention.

Figure 1:
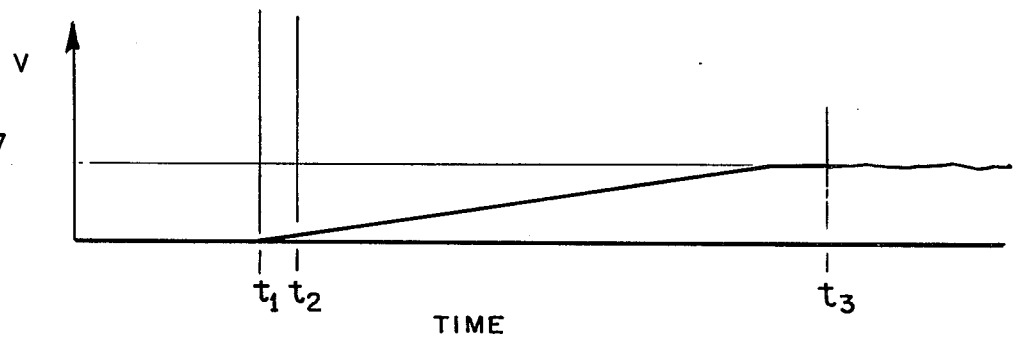
FIG. 1 illustrates a reference, or control, voltage which varies in a controlled manner which is generated by the system of the present invention.
Figure 2:
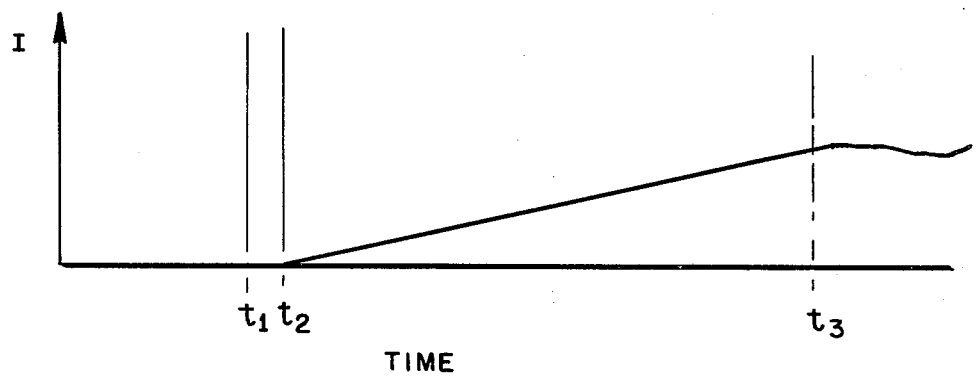
FIG. 2 illustrates a current signal generated by the system of the present invention.
Figure 3:
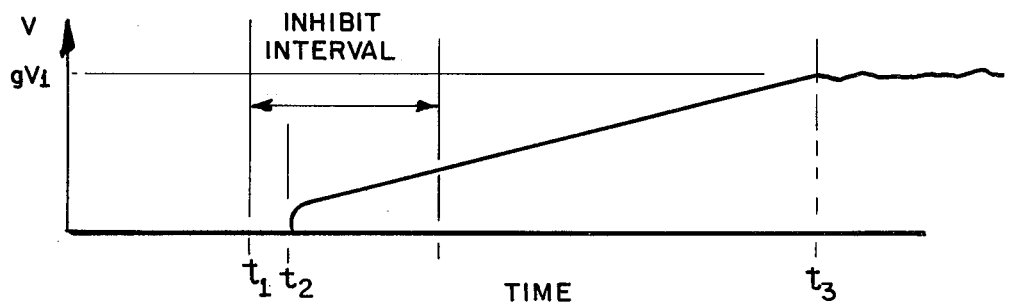
FIG. 3 illustrates an output high potential which is generated by the system of the present invention.

FIG. 1 illustrates the reference voltage waveform representative of the desired output voltage of the high-voltage generator according to the present invention. As will be recognized, the reference voltage begins at zero volts substantially upon energization of the generator at time $t_1$ and rises linearly to $V_1$ volts at a time $t_3$. Beginning at $t_2$, the capacitance of the high-voltage multiplier and atomizing and dispensing hardware coupled to it begins to be charged by a current waveform illustrated in FIG. 2, because the output voltage (FIG. 3) from the high-voltage multiplier follows the reference voltage waveform (FIG. 1) almost exactly, except that the high-voltage ramp is delayed from time $t_1$ to $t_2$ and is superimposed upon a lower-magnitude constant value which results from the manner in which the reference voltage (FIG. 1) is generated. The reason for the $t_1$–$t_2$ delay is because feed voltage typically is not available to the high voltage generator at sufficient magnitude immediately upon energization of the system at $t_1$.

Since there are no spikes or other anomolies in the high-voltage output waveform (FIG. 3), the value of the waveform at any instant after $t_2$ and until time $t_3$ is highly predictable. That voltage is the system gain, g, times the reference voltage. That being the case, slope circuits which monitor the output high voltage need not be inhibited during this interval, during which, with prior art systems, voltage spikes and noise sometimes occurred. Such spikes would cause the slope circuits to generate so-called "nuisance trip-outs." At time $t_3$, the output high voltage reaches $gV_1$, the set voltage, and goes under the control of a regulator driven by feedback from the high-voltage output.

Figure 4:
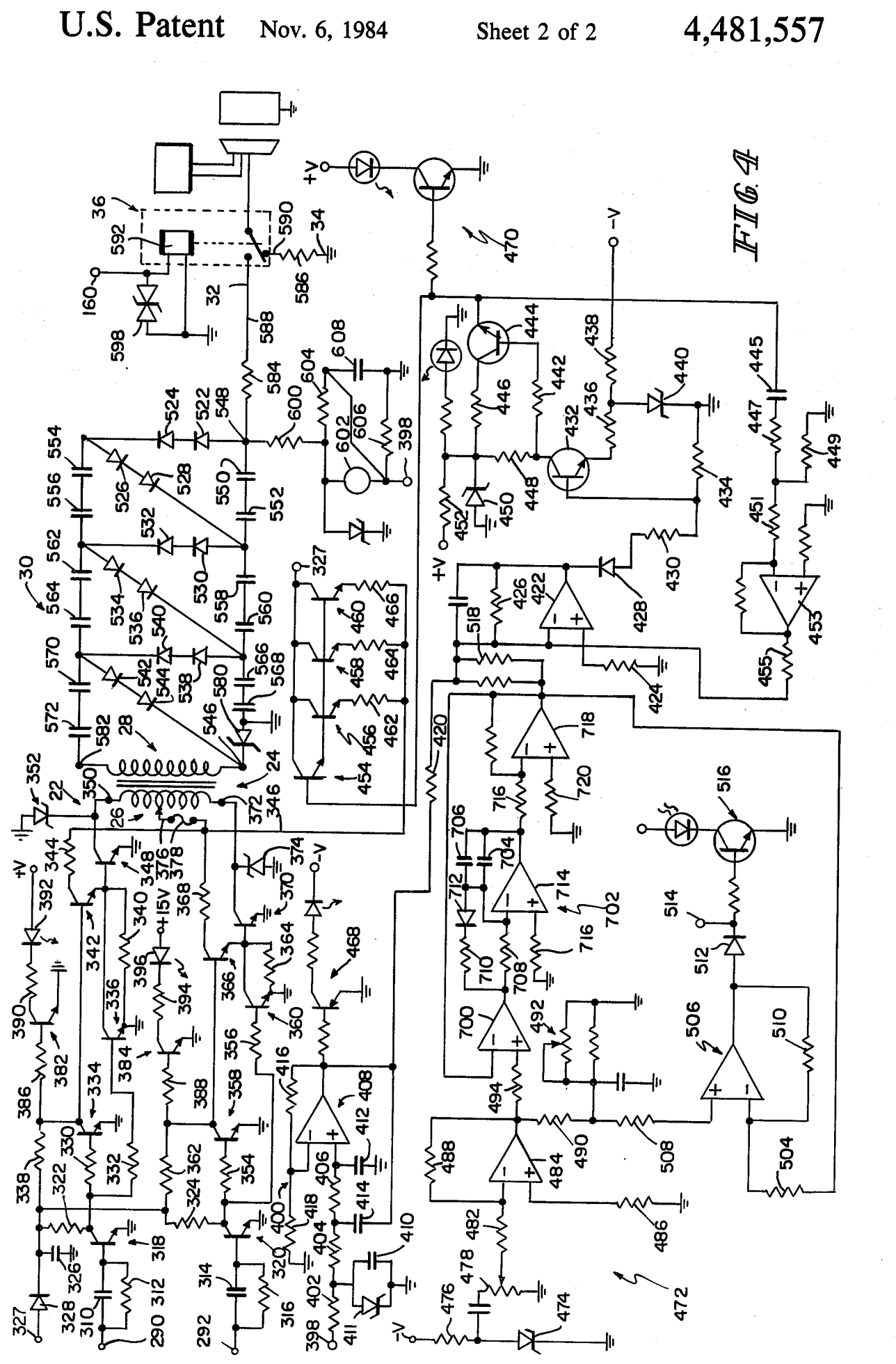

Referring now to FIG. 4, terminals 290, 292, which supply oppositely phased 2.5 KHz rectangular clock pulses from a clock (not shown), are coupled through parallel capacitor 310 and resistor 312, and parallel capacitor 314 and resistor 316, respectively, to the bases of two predriver transistors 318, 320, respectively. The emitters of transistors 318, 320 are coupled to ground, and their collectors are coupled through load resistors 322, 324, respectively, to a power supply capacitor 326. Capacitor 326 is coupled between terminal 327 of a DC power supply (not shown) through a diode 328 and ground.

The collector of transistor 318 is coupled through two base resistors 330, 332 to two driving transistors 334, 336, respectively. The collector of transistor 334 is coupled through a load resistor 338 to supply capacitor 326. The collector of transistor 336 is coupled through a resistor 340 to ground. The emitters of transistors 334, 336 are both grounded. The collector of driver transistor 334 is coupled to the base of a driver transistor 342. The collector of driver transistor 342 is coupled through a load resistor 344 to a regulating voltage supply bus 346. The emitter of transistor 342 is coupled to the collector of transistor 336 and to the base of an output transistor 348. The emitter of transistor 348 is grounded. The collector of transistor 348 is coupled to a terminal 350 of a high-voltage transformer 24 primary winding 26. The collector of transistor 348 is also coupled to the cathode of a Zener diode 352. The anode of Zener diode 352 is coupled to ground.

The collector of predriver transistor 320 is coupled through two base resistors 354, 356 to two driver transistors 358, 360, respectively. The collector of transistor 358 is coupled through a load resistor 362 to voltage supply capacitor 326. The collector of transistor 360 is coupled through a resistor 364 to ground. The emitters of transistors 358, 360 are both grounded. The collector of transistor 358 is also coupled to the base of a driver transistor 366. The collector of driver transistor 366 is coupled through a load resistor 368 to the regulating voltage supply bus 346. The collector of transistor 360 is coupled to the emitter of transistor 366 and to the base of an output transistor 370. The collector of output transistor 370 is coupled to a terminal 372 of the high-voltage transformer 24 primary winding 26. The collector of transistor 370 is also coupled to the cathode of a Zener diode 374, the anode of which is coupled to ground.

The several transistor stages between terminal 290 of clock 38 and terminal 350 of high voltage primary winding 26 amplify the signal on terminal 290 such that when the clock signal is positive-going, output transistor 348 is saturated, placing terminal 350 at approximately ground potential. When the signal on terminal 290 is negative-going, output transistor 348 is cut off. The several transistor stages between clock terminal 292 and the terminal 372 of the high-voltage primary winding 26 are driven in response to the oppositely phased clock signal at terminal 292. When the signal on terminal 292 is positive-going (corresponding to negative-going signal on terminal 290), output transistor 370 is saturated, placing terminal 372 at approximately ground. When the signal on terminal 292 is negative-going (corresponding to positive-going signal on terminal 290), output transistor 370 is cut off.

Current is supplied to high-voltage primary winding 26 through a center tap terminal 376. Terminal 376 is coupled to the regulating voltage supply bus 346 through a protecting fuse 378.

The bases of two transistors 382, 384, respectively, are coupled through base resistors 386, 388, respectively, to the collectors of driver transistors 334, 358, respectively. The emitters of transistors 382, 384 are grounded and their collectors are coupled through series resistor 390 and LED 392 and series resistor 394 and LED 396, respectively, to +V. LEDs 392, 396 provide visual indications of the operation of their respective driver transistors 334, 358.

A terminal 398 continuously monitors the output high-voltage signal. The signal on terminal 398 is directly proportional to the output high voltage between terminals 32, 34. Therefore, the signal on terminal 398 contains a substantial DC component corresponding to the high-magnitude DC component of the voltage across terminals 32, 34, e.g., 140 KV DC. However, the voltage across terminals 32, 34, and thus the signal on terminal 398, also includes a considerable amount of AC "ripple" or "noise" from several sources. For example, some of the noise can be traced to the 2.5 KHz switching in the high-voltage primary 26 which is coupled to the high-voltage secondary winding 28 and switching in the high-voltage rectifier and multiplier 30 wherein the voltage variations induced across secondary winding 28 are rectified and multiplied. In order to obtain a substantially noise-free signal related to the direct-current voltage only across terminals 32, 34, it is necessary to filter extensively the AC components from the signal on terminal 398.

Since some of this AC noise occurs at the 2.5 KHz switching rate, or at multiples thereof, a filter which rolls off at a frequency considerably lower than 2.5 KHz is used in the disclosed embodiment. The disclosed filter 400 is a three-pole, active filter of the type commonly known as a Butterworth filter. Filter 400 rolls off at 100 Hz. Terminal 398, the input terminal of filter 400, is coupled through three series resistors 402, 404, 406 to the non-inverting input terminal, +, of an operational amplifier 408.

The junction of resistors 402, 404 is coupled through a parallel combination of a capacitor 410 and a Zener diode 411 to ground. Pin + of amplifier 408 is coupled to ground through a capacitor 412. The output terminal of amplifier 408 is returned to the junction of resistors 404, 406 through a capacitor 414. The output terminal of amplifier 408 is also coupled through a feedback resistor 416 to the inverting input terminal, −, of amplifier 408. Terminal − is coupled to ground through a resistor 418.

The output terminal of amplifier 408 is coupled through a resistor 420 to the inverting input terminal, −, of an amplifier 422. The non-inverting terminal, +, of amplifier 422 is coupled through a resistor 424 to ground. A feedback resistor 426 is coupled between the output terminal of amplifier 422 and the − input terminal thereof.

The output terminal of amplifier 422 is also coupled to the cathode of a diode 428, the anode of which is coupled through a series resistor 430 to the base of a driver transistor 432. The base of transistor 432 is coupled through a resistor 434 to ground. The emitter of transistor 432 is coupled through a pair of series resistors 436, 438 to −V supply. The junction of resistors 436, 438 is coupled to the anode of a Zener diode 440, the cathode of which is grounded.

The collector of transistor 432 is coupled through a resistor 442 to the base of a regulating predriver transistor 444. The collector of transistor 444 is coupled through two resistors 446, 448 to the collector of transistor 432. The cathode of a Zener diode 450 is coupled to the junction of resistors 446, 448. The anode of the Zener diode 450 is grounded. The cathode of Zener diode 450 is coupled through a resistor 452 to +V. Feedback is provided to amplifier 422 from the emitter of transistor 444 through blocking capacitor 445, resistors 447, 449 and 451, the inverting (−) input terminal of an operational amplifier 453 and a summing resistor 455 to the − input terminal of amplifier 422.

The emitter of regulator predriver transistor 444 is coupled to the base of a regulator driver transistor 454. The collector of transistor 454 is coupled to direct current voltage supply terminal 327. The emitter of transistor 454 is coupled to the bases of three parallel coupled regulator output transistors 456, 458, 460. The collectors of transistors 456, 458, 460 are coupled to voltage supply terminal 327. Their emitters are coupled through series resistors 462, 464, 466, respectively, to supply bus 346.

The DC component of the high-voltage-related signal on terminal 398 is suppled to the − input terminal of amplifier 422. Amplifier 422 and transistors 432, 444, and 454 amplify this high-voltage DC-related signal and control transistors 456, 458, 460 therewith to regulate the magnitude of the direct-current voltage on supply bus 346. This voltage, which is fed to the center tap terminal 376 of high-voltage transformer primary winding 26, is the voltage which is switched across primary winding 26 and stepped up in secondary winding 28. The voltage generated across secondary winding 28 is thereby linearly controlled by the regulator. Indicator circuits 468, 470, which include transistor-controlled LEDs similar to those hereinbefore described, provide visual indications of signal flow through Butterworth filter 400 and regulator predriver transistor 444, respectively.

A high-voltage adjust circuit 472 operates through the high-voltage regulator. Circuit 472 includes a Zener diode 474, the cathode of which is grounded and the anode of which is coupled through a series resistor 476 to −V. A high-voltage adjustment potentiometer 478 is coupled across Zener diode 474 through a pair of relay contacts. The wiper of potentiometer 478 is coupled through a series resistor 482 to the inverting input terminal, —, of an amplifier 484. The non-inverting input terminal, +, of amplifier 484 is coupled through a resistor 486 to ground. The output terminal of amplifier 484 is coupled through a feedback resistor 488 to the — input terminal thereof. The output terminal of amplifier 484 is also coupled through two series resistors 490, 492 to ground.

The non-inverting input terminal, +, of an amplifier 506 is coupled through a series resistor 508 to the junction of resistors 490, 492. A feedback resistor 510 is coupled between the output terminal of amplifier 506 and the — input terminal thereof. The output terminal of amplifier 506 is further coupled to the anode of a diode 512, the cathode of which forms a terminal 514. An indicator circuit 516, including a transistor-controlled LED similar to the indicator circuits previously described, provides a visual indication of signal at terminal 514.

High-voltage rectifier and multiplier 30 provides, e.g., minus 140 KV DC. To generate this high voltage, the voltage variations induced in high-voltage transformer 24 secondary winding 28 are rectified and multiplied in circuit 30. Twelve high-voltage rectifying diodes 522–544 are coupled in series between terminal 546 of secondary winding 28 and the negative high-voltage terminal 548. Six pairs of series-coupled storage capacitors 550, 552; 554, 556; 558, 560; 562, 564; 566, 568; and 570, 572 are coupled, respectively, between the anode of diode 522 and the anode of diode 530; the cathode of diode 524 and the cathode of diode 532; the anode of diode 530 and the anode of diode 538; the cathode of diode 532 and the cathode of diode 540; the anode of diode 538 and the anode of a Zener diode 580, the cathode of which is coupled to terminal 546; and the cathode of diode 540 and the other terminal 582 of secondary winding 28.

A large-value series "safety" resistor 584 is coupled between negative high-voltage terminal 548 and output terminal 32. A series combination of a resistor 586 and the main current-conducting terminals 588, 590 of shorting device 36 are coupled between terminal 32 and ground. Terminals 588, 590 are the terminals of a normally closed solenoid-actuated relay. The control solenoid 592 of this relay is serially coupled between a terminal 160 and ground. A bidirectional Zener diode 598 is also coupled between terminal 160 and ground to protect against excessive voltage across solenoid 592.

High-voltage circuit 30 additionally includes a sensing circuit. One terminal of a very large-value resistor 600 is coupled to terminal 548. The remaining terminal of resistor 600 is coupled to the parallel combination of a kilovolt meter 602 and a meter-scale controlling resistor 604. The other terminal of this parallel combination is terminal 398. The parallel combination of a large-value resistor 606 and a capacitor 608 is coupled between terminal 398 and ground. In the circuit including resistors 600, 606, the resistance value of the parallel combination of KV meter 602 and scale resistor 604 is negligible compared to the values of resistors 600 and 606. Thus, resistors 600, 606 constitute an extremely high-resistance voltage divider between terminal 548 and ground. As was previously mentioned, a voltage signal directly related to the high voltage at terminal 548 is available at terminal 398.

The output terminal of amplifier 484 is further coupled through a resistor 494 to the non-inverting, +, input terminal of an amplifier 700 in a ramp signal generator circuit 702. The output terminal of amplifier 700 is coupled to one terminal of a parallel pair of ramp-start capacitors 704, 706, through a parallel resistor 708 and series resistor-diode combination 710, 712. The values of resistors 708, 710 are chosen to provide different charging and discharge time constants respectively for the capacitors 704, 706. Signal is supplied from the output terminal of amplifier 700 through resistor 708 to the inverting, or —, input terminal of an amplifier 714 in circuit 702. The non-inverting, or +, input terminal of amplifier 714 is coupled to ground through a resistor 716. The output terminal of amplifier 714 is coupled to the remaining joined terminals of parallel capacitors 704, 706. The output terminal of amplifier 714 is also coupled through a resistor 716 to the inverting, or —, input terminal of an amplifier 718 in circuit 702. The non-inverting, or +, input terminal of amplifier 718 is coupled through a resistor 720 to ground. The output terminal of amplifier 718 is coupled to the inverting, or —, input terminal of amplifier 700.

The output terminal of amplifier 718 is coupled through a series resistor 504 to the inverting input terminal, —, of amplifier 506.

The output terminal of amplifier 718 is also coupled to the inverting input terminal, —, of amplifier 422 through parallel resistors 518.

It will be appreciated that high-voltage adjust potential from potentiometer 478 will be supplied through amplifiers 484, 700, 714, 718 to the inverting input terminal, —, of amplifier 422. It should be understood that these signals linearly control regulator output transistors 456, 458, 460 in a manner similar to that in which actual high-voltage-related signals at terminal 398 of Butterworth filter 400 control transistors 456, 458, 460.

When the system is energized from alternating current line voltage, low DC voltage operating potential quickly becomes available to much of a typical high-voltage system, such as those illustrated in the prior art patents. However, it takes a somewhat longer time for operating voltage to be supplied across terminals 327 and ground of the main voltage supply circuit. Thus, certain control circuits, etc., (not shown) in the system will be in operation well before the full operating potential of minus 140 KV DC appears across terminals 32, 34. Since the switching and regulation circuit 22 includes means responsive to the voltage across terminals 32, 34, it will be appreciated that a start-up delay circuit is useful to prevent spurious triggering of the shorting device 36 by such circuits until operating potential is reached across terminal 327 and ground.

This start-up delay function is incorporated into the high-voltage switching and regulation circuit. Referring specifically to high-voltage adjust potentiometer 478 and its associated circuit components, positive potential will charge the ramp-start capacitors 704, 706 through resistor 708. Positive potential will also appear across voltage divider 490, 492 and at the non-inverting input terminal, +, of amplifier 506. The start-up potential across capacitors 704, 706 is supplied through amplifiers 714, 718 to the — input terminal of amplifier 506. Until the signal at the — input terminal of amplifier 506 exceeds the potential at the + input terminal of amplifier 506, the output terminal of amplifier 506 will remain positive. Indicator circuit 516 will produce a visual display of this condition. Terminal 514 will remain positive. After start-up capacitors 704, 706 have charged sufficiently, the output terminal of amplifier 506 will go to low potential. Terminal 514 will go to approximately ground potential, and terminal 160 to which terminal 514 is coupled by intervening circuits (not shown) will be controlled thereby.

The ramp-start potential across capacitors 704, 706 also controls the output potential across terminals 32, 34 through the summing of the ramp signal at the output terminal of amplifier 718 with the high-voltage representative signal at the output terminal of amplifier 408, and the supply of this sum signal to the output high-voltage controlling — input terminal of amplifier 422. It will be appreciated that this sum "desired output potential" signal acts directly through transistors 432, 444, 454, 456, 458, and 460 to control the feed voltage to the high-voltage transformer primary center tap 376.

What is claimed is:

1. A power supply for generating an electrostatic potential for charging a device from which coating material is dispensed to charge the coating material electrostatically as it is dispensed, the power supply including an electrostatic potential generator having an input control terminal, a pair of output terminals across which the device for dispensing charged coating material is to be coupled, means for selectively coupling the output terminals to the electrostatic potential generator, the means for selectively coupling the output terminals to the electrostatic potential generator including an input control terminal, means for sensing the potential across the output terminals, means for sensing current flow between the output terminals, means for developing a first signal related to the rate of change in current between the output terminals, means for coupling the first signal developing means to the means for sensing current flow between the output terminals, means for coupling the first signal developing means to the input control terminal of the means for selectively coupling the output terminals to the electrostatic potential generator, the first signal controlling the means for selectively coupling the output terminals to the electrostatic potential generator, the means for coupling the first signal developing means to the current flow sensing means and the means for selectively coupling the output terminals to the electrostatic potential generator operating after an inhibit interval after energization of the power supply to control the means for selectively coupling the output terminals to the electrostatic potential generator based upon sensed current, a circuit for generating a second signal for controlling the electrostatic potential generator, means for coupling the second signal generating circuit to the means for sensing the potential across the output terminals, means for coupling the second signal generating circuit to the input control terminal of the electrostatic potential generator, means for generating a ramp signal, the means for coupling the second signal generating circuit to the control terminal of the electrostatic potential generator including means for combining the ramp signal and the second signal in such a manner that, during the inhibit interval, the control terminal of the electrostatic potential generator is controlled by the ramp signal generating means, and at the end of the inhibit interval, the control terminal of the electrostatic potential generator is controlled by the means for sensing the potential across the output terminals.

* * * * *